May 12, 1959  E. O. PARZ  2,885,903
WORM WHEEL TOOTHING
Filed June 4, 1957

INVENTOR:
Erich Parz

United States Patent Office 2,885,903
Patented May 12, 1959

2,885,903

WORM WHEEL TOOTHING

Erich Otto Theodor Parz, Berlin-Weissensee, Germany, assignor to VEB Zahnschneidemaschinenfabrik Modul, Karl-Marx-Stadt, Germany Application June 4, 1957, Serial No. 663,379

Claims priority, application Czechoslovakia September 8, 1956

5 Claims. (Cl. 74—458)

This invention relates to improvements in gear systems and more particularly to a novel and improved worm gear which is intended for use in transferring torque in a positive and precision-fitting manner between two shafts which are arranged to cross each other. According to the purposes for which they are intended to be used, worm gears may be generally divided into two classifications, namely, precision worm gears and power worm gears.

In worm gears of the precision type, in the use of which it is necessary to transfer only a relatively small power, it is the desired object to provide very exact circular divisions. For this reason, such gears are referred to as "dividing worm gears." Such gears find use, for example, in dividing apparatus and dividing heads for milling machines, precision boring machines, circle dividing machines, tooth flank grinding machines, etc.

Worm gears of the power type, on the other hand, serve primarily to transfer large power so that precision of divisions is of lesser importance. In machine construction, it is common procedure to transfer torques through a large stepdown ratio.

Between these two extremes, there are instances in which the features of both precision and power are demanded in varying degrees. Such a combined requirement exists, for example, in gear hobbers.

It is well known that worm gears are made both with cylindrical screw-shaped worms, as well as globoidal worms. It is also common to provide worm gears with gaps at right angles to their axes in order to provide adjustments to minimize play during operation. Utilizing such type of worm gears, it is contemplated according to the present invention, to insure a sufficiently long length of contact or engagement for each tooth flank, which is necessary for faultless functioning, by providing a toothing which differs from the normal toothing. This improved toothing is characterized by the use of a diminished pressure angle and also by the location of the pitch point outwardly of the worm.

The most commonly used worm is that of cylindrical shape, with a tooth profile featuring straight flanks. The tooth profile is generally based on a standardized basic pattern in which the cross-sectional rack profile has a pressure angle of 20° when the worm is intended for use with involute gears. This results in the usual gear meshing relationship in which the number of respective right-hand or left-hand gear tooth flanks in operative engagement at any one time is always less than two.

Considering the worm gear as a precision gear, the equalizing operation for the purpose of making a median value of the divisions on a given section of the gear wheel, can be based on only one division. It must be considered that the divisions are inexact due to the inexactness of manufacturing methods. It is only possible to attain the median value of a single division, i. e. between two adjacent right or left-hand flank, respectively.

Considering the worm gear as a power gear, the calculation of tooth sizes can be based on the size of one tooth only, since the power is transferred through only one tooth at a time. For this reason, the globoid worm gear is most frequently employed for power transfer purposes. In such a case, there are, for example, four or five right-hand or left-hand tooth flanks active simultaneously. Globoid worm-gears are correspondingly more advantageous by reason of the intermediation between the particular faulty divisions, so that such gears work more precisely as precision gears. Considering the globoid gear as a power gear, there is the advantage that the rotating moment or torque to be transferred, will be taken up by several teeth.

The disadvantage of the globoid gear as compared to the normal worm gear, lies in the complexities of its manufacture and the difficulties encountered in its application for use. In manufacture, special jigs and tools are necessary, and in the mounting of such gears, the greatest degree of precision in positioning of the worm in all three spacial directions must be observed. For these reasons, the globoid gear has found use in a relatively small field as a precision and power gear, even when its use seems appropriate. For example, in gear-cutting machines, in view of the ever-increasing speed at which the gears must be run, very exact precision worm gears are of increasing significance.

It must also be considered that the gear cutter which is used to tooth the worm wheel of a globoid worm gear in the hobbing method, can only be used for one particular size of worm wheel, while the cylindrical hob can mill any size worm wheel which corresponds to its modulus. It may be further mentioned that worm wheels for globoid precision gears are often milled individually, where the dividing is done with the aid of optical instruments. This is required in order to obtain a greater precision of the divisions as compared to the machines which operate according to the self-generating method and which are equipped with circle-dividing worm gears. Clearly, more time is spent with this method compared to the continuous hob milling method, and it is desirable to avoid expending this extra time, if possible.

A sizable factor effecting precision in a worm gear is the degree of biasing force resulting from play in the worm wheel and also in the worm. As is well known, inaccuracy is caused by the fact that the toothing does not constitute true radii of the rotational axis of the toothed body, due to inaccuracy in production methods. It is common knowledge that this shortcoming manifests itself in faulty circular divisions. In order to minimize this fault, it has been attempted to diminish the degree of play-caused biasing force and the consequences thereof. It is often required, particularly in circle-dividing gears, that the toothing must be free from any play, i. e. that the right-hand as well as the left-hand flanks must fit tightly.

A particularly desirable advantage is the adjustment of a worm gear without play for purposes of precision, insofar as adjustment without play is at all possible. In order to adjust the worm gear without play, the teeth of the worm wheel are held between those of the worm so that the divisions of the right-hand flanks as well as those of the left-hand flanks are simultaneously in active engagement between the faulty divisions for purposes of equalizing, and in order to form a mean value. It is obvious that the larger the arcuate portion of the worm wheel in which the active right and left-hand flanks are located, the greater the equalizing force becomes.

In a worm gear with the normal 20° degree toothing, the equalizing is rather small because the number of teeth engaged by the worm is always less than two. In power gears, the described design is of no consequence, as the transfer of the torque is made only by the right-hand or left-hand flanks. Freedom from play may, for example, be effected by dividing the worm wheel on a plane at right angles to its axis, which plane also passes through the worm axis. This results in two disc-shaped bodies which are turned against each other sufficiently far until one-half with its right tooth-flanks and the other half with its left tooth-flanks, come to lie on the corresponding flanks of the worm.

Another possibility is provided by the use of the so-called "duplex worm." As is well known, in this type of worm, the right-hand and left-hand tooth flanks have rolling divisions which differ somewhat from each other, so that the screw-shaped worm tooth in its run displays a slightly conical shape. By moving the worm lengthwise along its axial direction, it is comparatively simple to find a position in which there is freedom from play. This solution is more advantageous than that first described, because the entire width of the worm wheel is active, and the proper distance between the axes is always insured, since the original adjustment as well as for the readjustment necessitated by possible wear, is done by moving the worm only in its axial direction.

It is, therefore, desirable that a worm gear or worm gear toothing should have the features of the duplex worm.

In the globoid worm gear, the use of the duplex worm is not possible because of the shape of the globoid worm. Therefore, the advantages associated with the duplex worm cannot be brought into effect. In globoid worm gears, the usual custom of disregarding the precise distance between axes of worm and worm wheel in adjusting for wear and freedom from play, by bringing the worm closer to the worm wheel, can never bring faultless results. Diminishing of the axis distance would require a smaller partitioning of the worm.

This invention avoids the shortcomings of known gears, as described, in making worm wheel toothing with tooth thicknesses at the pitch circle than 0.5 circle division, and tooth heights greater than normal. The worm wheel is made by the rolling-off or hobbing process by means of a grinding worm of conventional shape which has a diminished pressure angle and a pitch point positioned further outside from the profile center. In addition the worm wheel toothing is adaptable to be used with the duplex worm shape.

Additional objects and advantages of the invention will become apparent in the course of the following specification when taken in connection with the accompanying drawings which illustrate a worm assembly made in accordance with the invention, and for comparison conventional worm gear, and in which.

Figure 1:
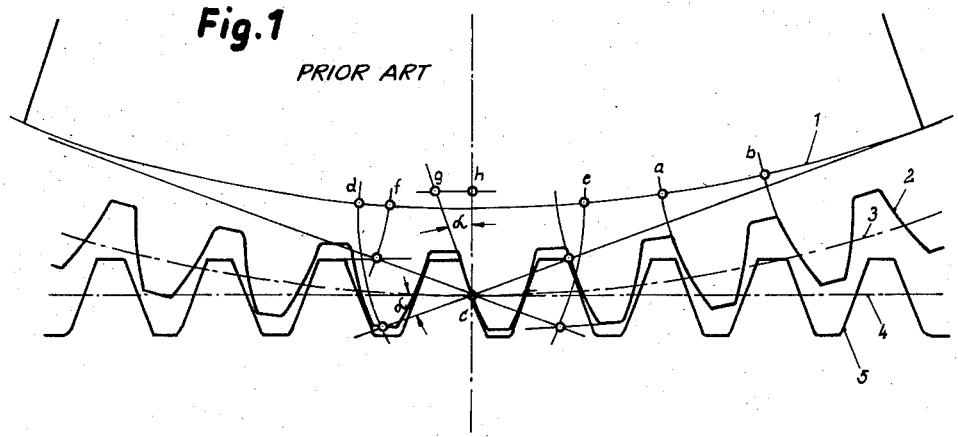
Fig. 1 is a schematic elevational view of a portion of a conventional worm wheel shown in meshed engagement with a corresponding conventional worm profile.

Referring to the drawings in detail, Fig. 1 shows a conventional worm gear assembly in which the worm wheel is of the conventional construction and of a standardized size having eighty teeth of equal modulus. The base circle of the worm wheel toothing is indicated by reference numeral 1. The worm wheel profile is indicated by reference numeral 2, while reference numeral 3 represents the pitch circle or rolling circle of the worm wheel.

Th worm in Fig. 1 has toothing defining a pitch line or rolling line 4, and having a profile 5.

The pressure angle $\alpha$ of the conventional worm gear assembly is 20°. The tooth engagement divisions of the worm wheel are represented on the base circle 1 by the arc having a length $a$—$b$. According to the conventional involute toothing shown in Fig. 1, the pitch point $c$ lies in the center of the tooth profile, the addendum of both the worm wheel and worm amounts to one times modulus, and the tooth thickness is equal to the width of the tooth spacing, i.e. it is equal to ½ times the division $a$—$b$. As indicated in Fig. 1, the active length of contact $f$—$e$ amounts to 1.9 tooth divisions. This means that the circumferential force of the worm wheel is received constantly by only one or two teeth, so that stress calculations can be based on the entire load acting upon only one tooth.

According to the arc $d$—$e$ on the basic circle 1, approximately 2.2 engagement divisions (i.e. teeth), are engaged by the worm at any one time. This means that the formation of a mean value can only be calculated between two divisions. Further, Fig. 1 shows that a biasing force which would make itself felt in the direction of the vertical center line, for example, to the extent $h$—$c$, would cause a change with regard to the division, to the extent of $g$—$h$, because of the pressure angle.

As the relationship of the distance $g$—$h$ to the distance $h$—$c$ corresponds to the tangent of pressure angle $\alpha$, the change of division becomes tangent $\alpha$ times the magnitude of the biasing force, therefore $\alpha=20°$ (i.e. 0.364 times the magnitude of the biasing force).

Figure 2:
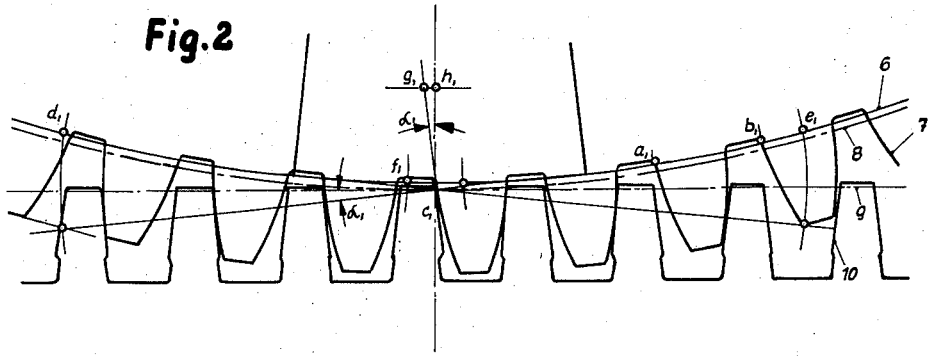
Fig. 2 is a similar schematic elevation showing a portion of a worm wheel and worm, made in accordance with the invention, in meshed engagement.

In Fig. 2, there is shown a worm wheel and worm of modified type, made in accordance with the invention. The base circle of the involute worm wheel toothing is designated by reference numeral 6. Numeral 7 represents the profile of the worm wheel, while 8 is the pitch circle or rolling circle of the worm wheel. Since the same modulus is made the basis of both Figs. 1 and 2, the pitch circle 8 of Fig. 2 corresponds exactly to the pitch circle 3 of Fig. 1.

The line 9 represents the pitch line or line of rolling-off movement development of the worm toothing. The profile of the worm is indicated at 10. The pressure angle $\alpha_1$, has been selected as 6°. The tooth engagement division is represented on the base circle 6 by the circular arc-portion $a_1$—$b_1$. The pitch point or rolling-off point $c_1$ is now located close to the outer diameter of the worm. The addendum of the worm wheel is selected as 2.4 times the modulus, and the addendum of the worm as 0.1 times the modulus. In the case of the worm, the basis of the tooth thickness has been taken as ⅓ times the tooth division $a_1$—$b_1$, while the basis of the tooth spacing has been taken as ⅔ times the tooth division $a_1$—$b_1$. The measurements of the worm wheel are in the complementary reversed sense.

Figure 3:
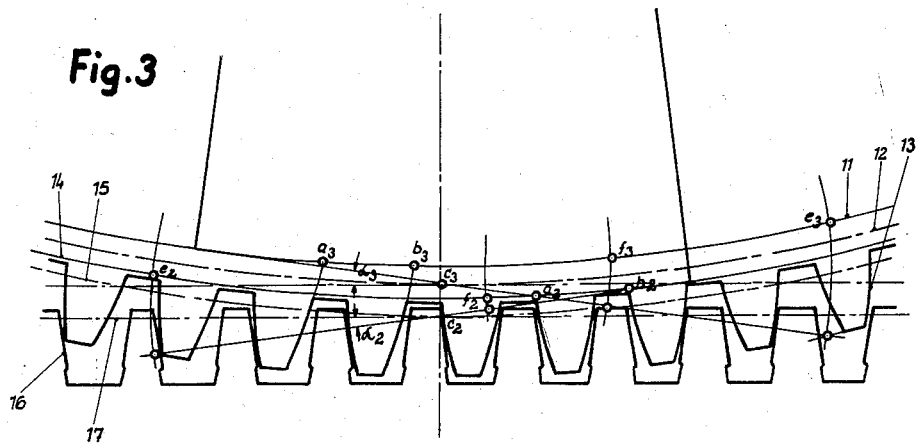
Fig. 3 is a similar schematic elevation showing a portion of a worm wheel and a so called "duplex worm" made in accordance with the invention, in meshed engagement.

In Fig. 3 there is shown a worm wheel in engagement with a so-called "duplex worm." The relationships for two positions ($c_2$ and $c_3$) of the pitch or rolling off point are simultaneously shown. In the first position ($c_2$) the rolling off point is still located inside the outline of the worm, but immediately on the crown circle. In the second position ($c_3$) the rolling off point is located outside the outline of the worm at a distance 0.7 times the modulus.

Numeral 13 represents the worm wheel profile and the profile of the "duplex worm" is designated by numeral 16. Corresponding to the rolling off point $c_2$ are the base circle 14, the pitch or rolling circle 15 and the pitch line or rolling off movement development line 17 of the worm gear and worm toothing.

Corresponding to the rolling off point $c_3$ are the base circle 11, the pitch or rolling circle 12 and the pitch line or rolling off movement development line 17 of the worm gear and worm toothing. The base circle portions (tooth engagement portions) are respectively designated as $a_2b_2$ and $a_3b_3$. The engagement distance per tooth flank for point $c_2$ is equal to distance $e_2f_2$ and has a length of 3.6 engagement divisions. The engagement distance per tooth flank for point $c_3$ is equal to distance $e_3f_3$ and has a length of 2.5 engagement divisions.

By engaging the "duplex worm" shown in Fig. 3 with the worm wheel of the invention instead of the evenly divided worm shown in Fig. 2 no significant changes in the operation of the device will occur. The evenly divided worm after being worn, can only be readjusted by means of the application of considerably more effort and expense than the "duplex worm." A characteristic of the "duplex worm," on the other hand, is that it can be readjusted by means of axial displacement.

There is no disadvantage in the provision of a relatively weaker worm tooth, as compared to the tooth of the worm wheel, since the material from which the worm is made is customarily several times as strong as the material from which the worm wheel is made.

According to the invention illustrated in Fig. 2, the engagement distance $f_1$—$e_1$ per tooth flank has a length of 3.6 engagement divisions. This means that three or four teeth are constantly available for power transfer, with the result that in computing the stress calculations, the strength of three teeth, instead of only one tooth, can be taken as a basis.

It can be further seen that the base circle arc $d_1$—$e_1$ which is encompassed by the worm, is approximately 6.8 tooth engagement divisions. This means that in adjusting the worm gear assembly for freedom from play, the median value of substantially seven teeth is attained. The improvement over the normal worm gear design of Fig. 1 is therefore 6.8/2.2=3.1 times.

Since the worm engages this far greater arc portion of the worm wheel, the formation of a median value between the defects in so many tooth divisions is available so that the precision of the worm gear improves with time to an ever-increasing extent.

The aforementioned advantages which have hitherto been achieved only by the globoid worm gear, will now be attained in the use of the cylindrical worm of the invention. The improved cylindrical worm also provides the following advantages which can not be achieved with the globoid worm:

The worm wheel toothing is formed by the usual hobbing or self-generating process. This avoids the time-consuming manufacturing process with special tools and jigs. For each modulus there is only one cylindrical cutter required to make worm wheels with different numbers of teeth. For the manufacture of the worm, no special apparatus is necessary, as is required in the production of globoid worm gears. The worm gear of the invention is simpler to set and control because the adjustment of the worm is required in only two spacial directions.

In addition, Fig. 2 shows that the change $g_1$—$h_1$ of the divisions caused by the biasing force corresponding to the pressure angle of 6°, amounts only to tangent 6° which is the same as 0.105 times the magnitude of the biasing force. Therefore, there is an improvement of $$\frac{0.364}{0.105}$$

or 3.5 times.

The adapting of the worm toothing of the invention to a duplex-worm shape has the following advantage as compared to the globoid worm gear: the adjustment for freedom from play as well as necessary readjustment for wear can be effected with optimum tooth engagement.

What is claimed is:

1. A worm wheel for use in a worm gear assembly which includes a worm adapted to mesh with the worm wheel, said worm wheel having involute teeth arranged in equal tooth divisions, each of said teeth having a thickness at the pitch circle greater than 0.5 tooth divisions, each tooth also having a height sufficient to locate the pitch point outwardly of the center of the coordinated worm profile.

2. A worm wheel for use in a worm gear assembly which includes a worm adapted to mesh with the worm wheel, said worm wheel having involute teeth arranged in equal tooth divisions, each of said teeth having a thickness at the pitch circle greater than 0.5 tooth divisions, each tooth also having an addendum greater than the modulus, the pitch point being located proximate to the outer diameter of the worm.

3. A worm wheel assembly comprising a worm wheel and a meshing cylindrical worm, the worm wheel having spaced involute teeth arranged in equal tooth divisions, each of said teeth having a thickness at the pitch circle of substantially ⅔ tooth divisions, each worm wheel tooth also having an addendum greater than the modulus, said worm having a pressure angle of substantially 6°, and having a tooth thickness at the pitch circle of substantially ⅓ tooth divisions, the pitch point being located proximate to the outer diameter of the worm.

4. A worm wheel according to claim 3, in which the worm has a duplex-worm shape with a gradual, continuously-increasing tooth thickness.

5. A worm wheel for use in a worm gear assembly, including a meshing worm, and adapted to be made by the rolling-off hobbing process utilizing a grinding worm having teeth with diminished pressure angles and a pitch point located outwardly of the grinding worm profile center, said worm wheel having teeth arranged in equal tooth divisions, each of said teeth having a thickness at the pitch circle greater than 0.5 tooth divisions, each tooth having a height sufficient to locate the pitch point outwardly of the center of the tooth profile of the meshing worm of said gear assembly.

References Cited in the file of this patent
UNITED STATES PATENTS

| | | |
|---|---|---|
| 1,822,800 | Cone | Sept. 8, 1931 |
| 1,966,358 | Robak | July 10, 1934 |
| 2,669,128 | Steiner | Feb. 16, 1954 |